Aug. 23, 1960

G. H. SUNDIN 2,949,999

UNLOADING MECHANISM FOR BELT CONVEYORS

Filed Dec. 11, 1958

INVENTOR.
GEORGE H. SUNDIN
BY Donald G. Dalton
ATTORNEY

United States Patent Office 2,949,999
Patented Aug. 23, 1960

2,949,999

UNLOADING MECHANISM FOR BELT CONVEYORS

George H. Sundin, Duluth, Minn., assignor to United States Steel Corporation, a corporation of New Jersey Filed Dec. 11, 1958, Ser. No. 779,606

10 Claims. (Cl. 198—185)

This invention relates to an improved device for unloading a belt conveyor.

The present application is a continuation-in-part of my earlier application Serial No. 656,230, filed May 1, 1957, which issued as Patent No. 2,902,143 September 1, 1959.

Although my invention has general application for unloading belt conveyors carrying any sort of bulk materials, it is particularly useful for those which carry fragile materials, such as freshly formed balls of iron ore fines. One known procedure for agglomerating iron ore fines involves moistening the fines and forming them into balls on a rotating drum or disk. The balls then are conveyed to a heat treating apparatus, such as a shaft furnace or traveling grate, which heats them to the point of incipient fusion, thereby giving them sufficient mechanical strength for handling in a blast furance. Before heat treatment green balls are structurally weak and easily broken, yet they must be unloaded from a conveyor and distributed over a considerable area when they are introduced to the heat treating apparatus in order for the apparatus to operate properly. Another use for which my unloading device is particularly suited is for sampling material carried on a belt conveyor, since it can cut the full stream of material to assure a representative sample.

An object of the present invention is to provide, in combination with a belt conveyor, an improved unloading device which discharges material from a side edge of the conveyor in steps by tilting a section of the belt and which includes positive means for preventing material from discharging except at the intended location.

A further object is to provide an unloading device which has the foregoing characteristics and also includes means for relocating or centering material on the belt as it tilts.

A more specific object is to provide an improved unloading device of the foregoing type which includes a combined retainer cover for preventing material from dropping off portions of the belt upstream and downstream of the intended discharge location and a relocation guide for centering material on the belt as these portions also tilt.

In accomplishing these and other objects of the invention, I have provided improved details of structure, preferred forms of which are shown in the accompanying drawings, in which.

Figure 1:
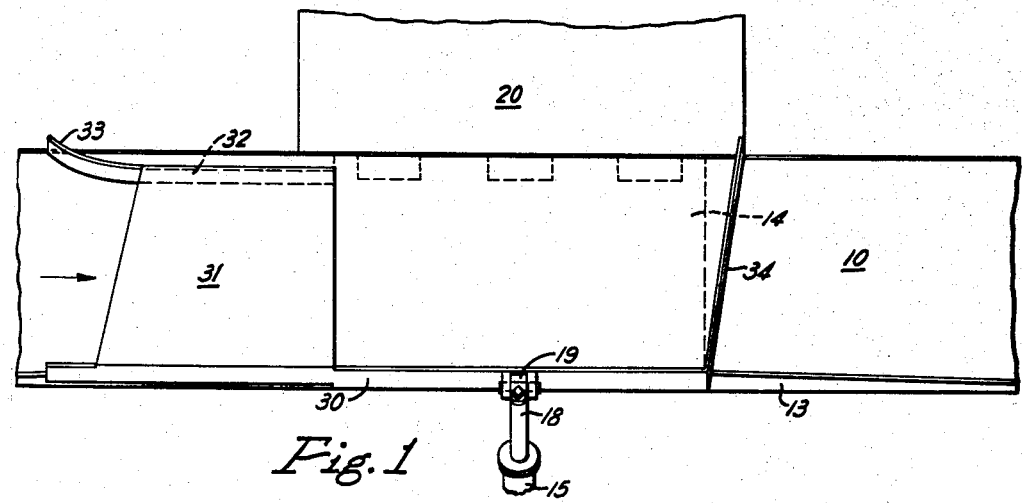
Figure 1 is a top plan view of a portion of a belt conveyor equipped with an embodiment of my device for unloading all material carried by the belt.

Figures 1 to 4 show a portion of a conventional flexible conveyor belt 10 whose carrying flight is supported on a frame 13. The belt runs over suitable pulleys, not shown, and is suitably driven to carry bulk material from left to right. My unloading device includes a rectangular plate 14 hinged at one edge to frame 13 for tilting on an axis parallel to the direction of belt travel and underlying a section of the belt. A pneumatic cylinder 15 is pivoted to trunnions 16 which are mounted on a suitable support 17 situated below the carrying flight of the belt on the opposite side from the hinged mounting of plate 14. The cylinder contains a reciprocable piston and piston rod 18 connected through a pivoted link 19 to the edge of plate 14 opposite the hinged mounting. A discharge chute 20 is situated adjacent the hinged mounting and slopes downwardly away from the belt. In the example of a conveyor which carries balled iron ore fines, the discharge chute either can lead to a launder at the mouth of a shaft furnace or can extend across a traveling grate.

Cylinder 15 is single-acting and has a gravity or spring return. An air inlet pipe 21 leads to the lower end of the cylinder and contains a conventional pressure regulator 22 and a three-way valve 23 having an operating solenoid 24. Normally the solenoid is deenergized and the valve positioned to vent the cylinder, whereby the piston rod 18 is retracted and plate 14 horizontal. When the solenoid is energized, the valve moves to a position to admit compressed air to the cylinder to project the piston rod. Plate 14 quickly swings upwardly about its hinged mounting, tilts the overlying section of belt 10, and throws material from this section sideways onto chute 20. Thereafter the solenoid is quickly deenergized and the parts return to their normal position, all without stopping the belt. This embodiment of my device includes a mechanism for energizing the solenoid each time the belt travels a distance equal to the length of plate 14. My aforesaid patent describes and claims one suitable form of mechanism for this purpose; hence the showing is not repeated here.

In accordance with the present invention, the longitudinal edge of plate 14 opposite the hinged mounting carries an upstanding flange 30. The upstream end of this flange carries a retainer cover 31 which projects over the belt and is spaced thereabove. The cover has a depending longitudinal flange 32 at the side opposite flange 30. Flange 32 is spaced inwardly from the adjacent side edge of the belt, and the bottom of the flange has fairly close clearance with the upper surface of the belt. Flange 32 has an extension 33 which curves outwardly upstream of the belt and terminates substantially at the side edge of the belt. The downstream end of flange 30 carries an end plate 34 which extends across the belt and likewise has fairly close clearance with its upper surface.

Figure 2:
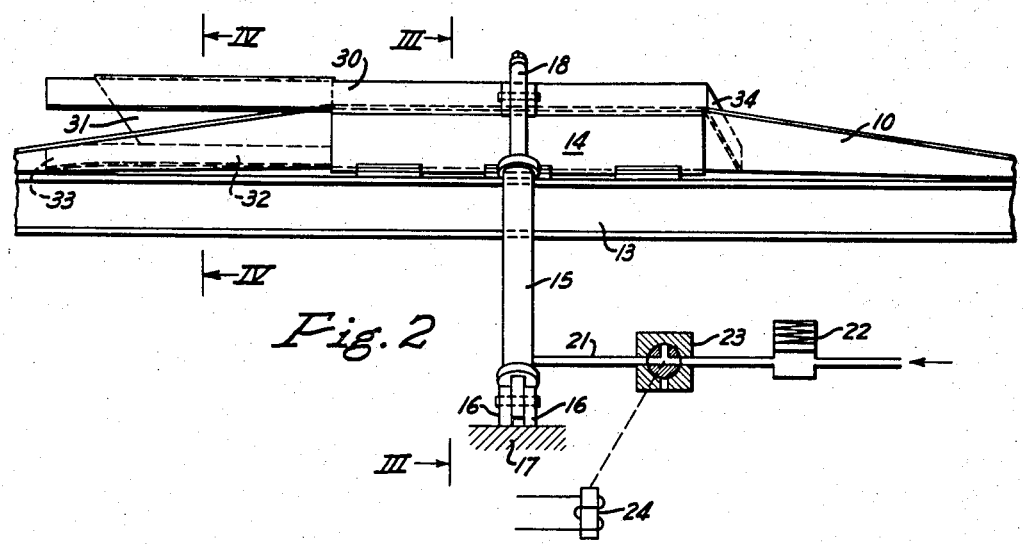
Figure 2 is a rear elevational view of the structure shown in Figure 1.
Figure 3:
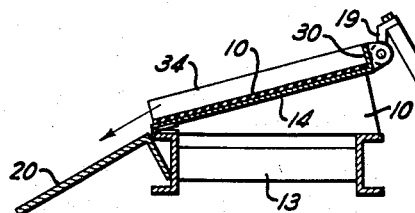
Figure 3 is a vertical section on line III—III of Figure 2.
Figure 4:
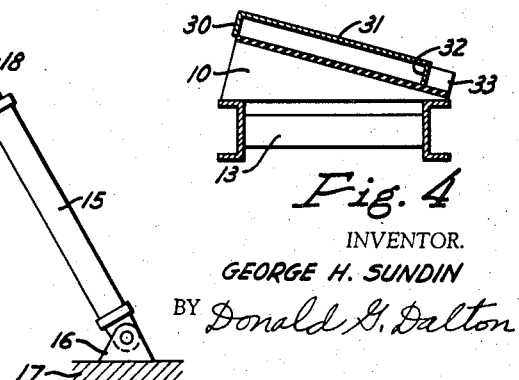
Figure 4 is a vertical section on line IV—IV of Figure 2.

When plate 14 is raised to tilt the overlying section of belt 10 to unload material, adjacent portions of the belt also tilt and become distorted, as indicated in Figure 2. The retainer cover 31 and flange 32 prevent material from discharging from the distorted portion of the belt upstream of plate 14. The extension 33 forms a relocation guide to direct material entering the cover toward the longitudinal center line of the belt and thus prevent its piling up along the edge of the belt. The end plate 34 prevents any material on the belt from being carried beyond plate 14 and thus discharging downstream of the plate.

Figure 5:
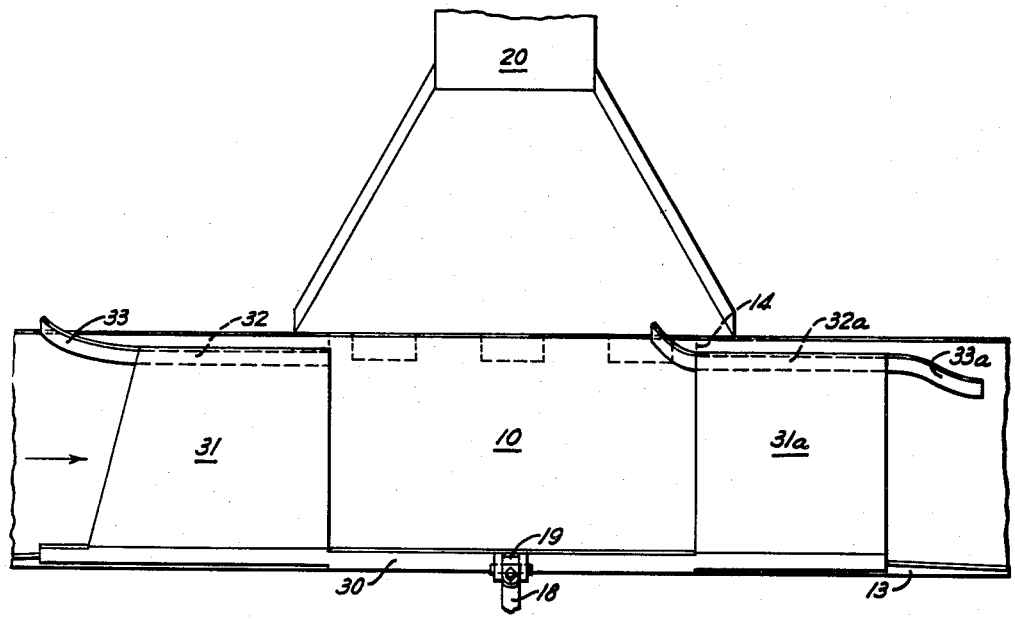
Figure 5 is a top plan view of a portion of a belt conveyor equipped with a modified embodiment of my device for sampling material carried by the belt.
Figure 6:
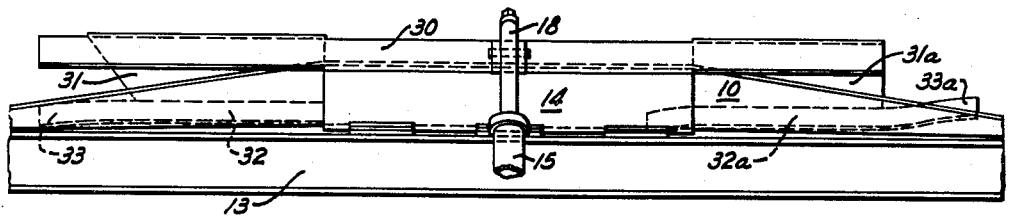
Figure 6 is a rear elevational view of the structure shown in Figure 5.

Figures 5 and 6 show a modified embodiment in which the end plate 34 is replaced by a second retainer cover 31a at the downstream end of plate 14. This second cover has a depending longitudinal flange 32a which lies substantially along the side edge of the belt. Flange 32a carries a relocation guide 33a which curves inwardly downstream of the belt. This embodiment is used for sampling material carried by the belt; hence plate 14 is tilted automatically or by manual actuation only at intervals when samples are desired. Between samplings the second retainer cover does not interfere with movement of material on the belt. When a sample is taken, the second retainer cover 31a and relocation guide 33a function in the same manner as cover 31 and guide 32 to control material downstream of plate 14. Since the device otherwise is similar to the embodiment already described, the description is not repeated.

From the foregoing description it is seen that my invention affords a simple device for unloading a belt conveyor, either of all its material or of selected portions for sampling. In either event the device affords positive means for preventing loss of material at other than the intended location. The device also assures that the material remains near the midportion of the belt and does not pile up along an edge.

While I have shown and described certain preferred embodiments of the invention, it is apparent that other modifications may arise. Therefore, I do not wish to be limited to the disclosure set forth but only by the scope of the appended claims.

I claim:

1. The combination, with a conveyor belt and a frame therefor, of an unloading device comprising means underlying a section of said belt for tilting on an axis parallel to the direction of belt travel, means for quickly tilting and returning said first named means and thereby throwing material from the side edge of said belt without stopping the belt, and retaining means overlying said belt for preventing discharge of material from said belt from the portion thereof upstream of said first named means as this portion of the belt is distorted with tilting of said first named means.

2. A combination as defined in claim 1 comprising a guide overlying said belt for guiding material on the belt toward the longitudinal center line as said first named means is tilted and thus preventing material on the distorted portion of the belt from piling up at the edge of the belt.

3. The combination, with a conveyor belt and a frame therefor, of an unloading device comprising a plate underlying a section of said belt and being hingedly mounted at one edge on said frame for tilting on an axis parallel to the direction of belt travel, means connected to said plate for quickly tilting it about its hinged mounting and returning it and thereby lifting and returning the overlying section of said belt to throw off material from the side edge of the belt without stopping the belt, and retaining means overlying said belt for preventing discharge of material from said belt from portions thereof upstream and downstream of said plate as these portions of the belt are distorted with tilting of said plate.

4. A combination as defined in claim 3 in which the means for preventing discharge of material from the distorted portion of said belt upstream of said plate includes a retainer cover carried by said plate at its upstream end and spaced above said belt and having a flange extending longitudinally of said belt adjacent the edge from which material discharges, the bottom edge of said flange having close tolerance with the upper surface of said belt.

5. A combination as defined in claim 4 in which the means for preventing discharge of material from the distorted portion of said belt downstream of said plate includes an end plate fixed to said first named plate at its downstream end, said end plate extending across said belt with its bottom edge having close clearance with the upper surface of said belt.

6. A combination as defined in claim 4 in which the means for preventing discharge of material from the distorted portion of said belt downstream of said plate includes a second retainer cover carried by said plate at its downstream end and spaced above said belt and having a flange extending longitudinally of said belt adjacent the edge from which material discharges, the bottom edge of said last named flange having close clearance with the upper surface of said belt.

7. The combination, with a conveyor belt and a frame therefor, of an unloading device comprising a plate underlying a section of said belt and being hingedly mounted at one edge on said frame for tilting on an axis parallel to the direction of belt travel, means connected to said plate for quickly tilting it about its hinged mounting and returning it and thereby lifting and returning the overlying section of said belt to throw off material from the side edge of the belt without stopping the belt, retaining means overlying said belt for preventing discharge of material from said belt from portions thereof upstream and downstream of said plate as these portions of the belt are distorted with tilting of said plate, and a guide overlying said belt upstream of said plate for guiding material on the belt toward the longitudinal center line of the belt and thus preventing material on the upstream distorted portion thereof from piling up at the edge of the belt.

8. A combination as defined in claim 7 in which the means for preventing discharge of material from the distorted portion of said belt upstream of said plate includes a retainer cover carried by said plate at its upstream end and spaced above said belt and having a flange extending longitudinally of the belt inwardly of the edge from which material discharges, the bottom edge of said flange having close clearance with the upper surface of said belt, and in which said guide includes an extension of said flange curving outwardly to the edge of said belt upstream thereof.

9. A combination as defined in claim 8 in which the means for preventing discharge of material from the distorted portion of said belt downstream of said plate includes an end plate fixed to said first named plate at its downstream end, said end plate extending across said belt with its bottom edge having close clearance with the upper surface of said belt.

10. A combination as defined in claim 8 in which the means for preventing discharge of material from the distorted portion of said belt downstream of said plate includes a second retainer cover carried by said plate at its downstream end and spaced above said belt and having a flange extending longitudinally of said belt along the edge from which material discharges, the bottom edge of said last named flange having close clearance with the upper surface of said belt, said last named flange having an extension curving inwardly toward the longitudinal center line of said belt downstream thereof for guiding material on the belt toward the center line and thus preventing material on the downstream distorted portion from piling up at the edge.

References Cited in the file of this patent
UNITED STATES PATENTS
706,294    Beck _____ Aug. 5, 1902
FOREIGN PATENTS
116,424    Australia _____ Feb. 25, 1930

UNITED STATES PATENT OFFICE

CERTIFICATE OF CORRECTION

Patent No. 2,949,999                          August 23, 1960

George H. Sundin

It is hereby certified that error appears in the printed specification of the above numbered patent requiring correction and that the said Letters Patent should read as corrected below.

Column 3, line 66, for "tolerance" read -- clearance --.

Signed and sealed this 4th day of April 1961.

(SEAL)
Attest: ERNEST W. SWIDER
Attesting Officer

ARTHUR W. CROCKER
Acting Commissioner of Patents